United States Patent
Toth et al.

(10) Patent No.: US 7,185,115 B2
(45) Date of Patent: Feb. 27, 2007

(54) MODULAR SYSTEM FOR CONNECTING MULTIPLE CUSTOMER PREMISES VOICE AND DATA COMMUNICATIONS DEVICES TO A T1 DATA LINE

(75) Inventors: Robert James Toth, Huntsville, AL (US); Gary M. Willoughby, Harvest, AL (US); W. Stuart Venters, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 882 days.

(21) Appl. No.: 09/834,988

(22) Filed: Apr. 13, 2001

(65) Prior Publication Data

US 2002/0072345 A1  Jun. 13, 2002

Related U.S. Application Data

(60) Provisional application No. 60/197,236, filed on Apr. 14, 2000.

(51) Int. Cl.
*G06F 15/16* (2006.01)
(52) U.S. Cl. ........................ 709/250; 709/217; 709/220
(58) Field of Classification Search ................ 709/218, 709/229, 249, 250, 217, 220
See application file for complete search history.

(56) References Cited

U.S. PATENT DOCUMENTS

| | | | | | |
|---|---|---|---|---|---|
| 4,971,563 | A | * | 11/1990 | Wells, III | 439/61 |
| 5,495,516 | A | * | 2/1996 | Lee et al. | 379/14.01 |
| 5,740,241 | A | * | 4/1998 | Koenig et al. | 379/399.01 |
| 6,304,574 | B1 | * | 10/2001 | Schoo et al. | 370/401 |
| 6,324,608 | B1 | * | 11/2001 | Papa et al. | 710/104 |
| 6,363,477 | B1 | * | 3/2002 | Fletcher et al. | 713/151 |
| 6,516,053 | B1 | * | 2/2003 | Ryan et al. | 379/21 |
| 6,563,821 | B1 | * | 5/2003 | Hong et al. | 370/389 |
| 6,775,707 | B1 | * | 8/2004 | Bennett et al. | 709/233 |

* cited by examiner

*Primary Examiner*—John Follansbee
*Assistant Examiner*—Mohammad Siddiqi
(74) *Attorney, Agent, or Firm*—Waddey & Patterson, P.C.; Larry W. Brantley; Howard H. Bayless

(57) ABSTRACT

An integrated system concurrently connects voice and data communications devices used by small and medium sized businesses to a network T1 data line terminating at the customer premises. A system chassis includes multiple slots and backplane connectors for removably receiving a bank controller unit (BCU), power service unit (PSU), and one or more different types of smart and dumb voice and data access modules that provide the functional interface to the customer premises equipment. The BCU controls the operation of the system, which can be configured by the customer through an external terminal interface.

10 Claims, 14 Drawing Sheets

MODULAR SYSTEM FOR CONNECTING MULTIPLE CUSTOMER PREMISES VOICE AND DATA COMMUNICATIONS DEVICES TO A T1 DATA LINE

This application claims the benefit of now abandoned U.S. Provisional Patent Application Ser. No. 60/197,236, filed on Apr. 14, 2000 and entitled "Modular System for Connecting Multiple Customer Premises Voice and Data Communications Devices to a T1 Data Line."

BACKGROUND OF THE INVENTION

The present invention relates in general to voice and data communications systems, and is more particularly directed to systems for providing integrated voice and data access to a T1 carrier data line terminating at the customer premises.

Providers of voice and data communications services frequently provide a connection to their customers' premises using a T1 circuit. The term "T1 circuit" is commonly used to identify a multiplexed 24 channel, 1.544 Mbps digital data circuit providing communications between two facilities or from a local service provider to a customer. "T1" refers to the transport of a DS1 formatted signal over a copper, fiber or wireless medium for deploying voice, data or video-conferencing services. The 'T' designation refers the bit rate and the copper transmission system and the 'DS' designation refers to the bit format and framing. However, many times the terms are used interchangeably. A single 64 kbps channel is called a DSO. The T1 rate of 1.544 Mbps for providing 24 channels of 64 kbps each is referred to as a "DS1."

The T1 circuit is part of an extensive digital communications hierarchy that starts with 24 DSO's at 64 kbps each. These individual DSO's are used to provide voice or digital data to support point-to-point or network applications. By combining multiple DSO's, a high-speed interface can be provided to support a synchronous interface to a Local Area Network (LAN) router or voice PBX. For distances longer than one mile, a repeater is placed every mile to regenerate the signal.

As competition for providing dial tone and bandwidth to customers increases, communications service providers must find integrated access devices that allow cost-effective deployment of voice and data services at the customer's premises. Many T1 service customers will have a variety of different voice and data hardware devices and communications systems installed at the customer premises, each of which must share a connection to a single T1. Examples of customer premises communications devices that may require a concurrent interface to network T1 include:

- analog telephone devices, requiring Foreign Exchange Office (FXO) and/or Foreign Exchange Subscriber (FXS) interfaces;
- network routers, bridges, switches; and codecs (coders/decoders) used in audio broadcast and video conferencing systems; each having standard V.35 DTE (Data Terminal Equipment) interface connections;
- Four wire DDS (Digital Data Service) devices, such as a CSU/DSU (Channel Service Unit/Data Service Unit) for connecting to a WAN (Wide Area Network);
- ISDN (Integrated Services Digital network) devices; and
- Fractional T1 communications.

Conventional integrated T1 access devices may combine all of this functionality into a single unit that is not scaleable, meaning that the customer must often purchase a system having more functionality and more interface components into the device than the customer initially needs. Also, the requirements of the customer may change after the T1 integrated access unit is purchased. Because conventional integrated access devices are typically supplied with a hardware and interface configuration that is fixed internally, a change in customer needs may result in a costly internal re-configuration or equipment replacement decision by the customer. While a re-configuration takes place to add a new interface component, for example, the entire access unit must be disabled, thereby disrupting all of the customer communications systems that share the T1. In other words, it is difficult for the customer to "mix and match" the access device interfaces to the customer's different communications hardware as the customer's needs change after the access unit is purchase and initially configured. In fact, many conventional T1 integrated access devices cannot under any circumstances serve all of the customer's voice and data applications at the same time.

Another undesirable characteristic of conventional integrated access devices is the expense associated with the design of the different components that provide the interface to the different customer premises devices described above. Often, each of these interface components will be "smart", having its own processor or other similar hardware and software to provide a high degree of 'stand alone' control of the operations of that interface component. The combined presence of this redundant processing power within each interface component of the integrated T1 access unit increases the total cost of purchase and ownership and may increase the complexity of device control and management.

In many applications where T1 access devices are installed at the customer premises, there is a need for a separate AC power supply to power the device as well as an auxiliary battery back-up system to protect the operation of critical communications devices that are connected to the T1 in the even of a power failure. There are a wide variety of conventional AC power supplies and back-up systems available for this purpose. A block diagram of a typical combination AC power supply and battery backup system 100 used in the prior are is shown in FIG. 13 A conventional rectification and power conditioning section 101 has two outputs as shown. The first output (output 1) is connected to an electronic system (such as a T1 access system) to provide power to the system during normal operation. The first output is also linked to a battery monitoring and back-up relay control circuit 102. The monitoring/control circuit 102 monitors the first output to determine if the voltage being supplied to the electronic system is within specified parameters for the electronic system and, if not, sends a signal to the normally-open relay circuit 103 to switch the battery 104 into the power circuit to the electronic system. The second output (output 2) is used to maintain a charge on the battery 104 and is connected to the battery 104 and opens the normally closed relay 106 when the battery electrical parameters deviate from normal.

There are several weaknesses in the typical prior art system 100 as illustrated in FIG. 13. Fist, because the rectification/conditioning section 101 must have two separate outputs, the complexity (e.g., parts count) of the section is increased which can add to the overall all expense of the system 100. Second, the separate charge limiting circuit 105 also increases the component count and power dissipations of the system 100. Third, the battery back-up function of the prior art system 100 is not entirely automatic because the battery 104 is not connected to the electronic system during normal operation. Rather, the monitoring and relay circuit 102 must be used to close the relay circuit 104 when an abnormal condition is detected at output 1.

Accordingly, there is a need for a low cost, easy to use system for allowing a small business customer to send and receive voice and data traffic over a single T1 terminating at the customer's premises. Preferably such a system will be scalable and easily re-configured to adapt to different communications needs of the customer. In addition, there is need for an improved and lower cost AC power supply and battery back-up system to power T1 interface devices as well as other communications equipment.

SUMMARY OF THE INVENTION

The system of this invention is a low-cost integrated T1 access device, allowing service providers to offer combined voice and data traffic over a single T1 terminating at a small or medium size business customer's premises. The system supports a broad series offering including analog voice (FXO/FXS), NxData, fractional T1, ISDN and DDS.

In one embodiment, the system provides six slots in a single system chassis for the customer to combine a variety of voice and data services access modules based on the specific requirements of each application. In one embodiment, up to six quad FXS or FXO access modules having automatic gain adjustment provide up to 24 analog voice lines. TR-08 capability allows connection directly to the central office switch.

Data options include a fractional T1 port, as well as DDS, ISDN, and Nx56/64 access modules. The fractional T1 drop-and-insert port on the rear of the system chassis provides a convenient method of dropping a number of DSO's to a PBX or other equipment via a DSX-1 signal.

The system, including the access modules, is controlled and supervised by a bank controller unit (BCU) having an internal processor connected to an external terminal interface that can be used for system management and testing. The BCU also includes an integral T1 channel service unit (CSU) for terminating the network T1 and allowing outside plant (OSP) cabling. Optionally, the BCU will also incorporate a fractional T1 interface. The BCU internal processor allows it to control and supervise "dumb" access modules (those without processors), further lowering the total cost of the system.

System power is provided by a chassis mounted power service unit (PSU) that allows the system to be powered from the central office signal. In a preferred embodiment, the PSU also supplies ring generation for any analog telephones (POTS) connected to the system through an FXS access module. Optionally, the system may be configured with an AC power supply and mounted to the exterior of the system chassis and battery back-up unit. The AC power supply has a reduced complexity and component count and the battery back-up unit is entirely automatic because the battery is connected to the system during normal operation.

The architecture of the system facilitates cost-efficient growth or change in the communications needs of the small or medium size business customer. Because the provider only installs the number of voice ports needed for the customer's application, initial turn-up costs are lower because the provider can defer access module cost until it is needed. In data applications, the system provides the flexibility to mix voice and data units also based on the particular requirements of each customer application.

When maintenance becomes necessary, the system design allow technicians to reach the access modules, BCU, power supplies and battery back-up system easily. Access modules are hot swappable and accessible at all times. An individual access module may be replaced without disrupting other modules and services. The quad FXS/FXO access module design ensures that a maximum of only four analog circuits are affected when replacing an access module.

BRIEF DESCRIPTION OF THE DRAWINGS

FIG. 4(*b*) is a block diagram showing use of the system of this invention to connect a conventional analog telephone (POTS) at the customer premises to a central office switch over an incoming T1 line by using a Foreign Exchange Subscriber (FXS) access module operating in a TR-08 signaling mode.

DESCRIPTION OF THE PREFERRED EMBODIMENTS

Figure 1:
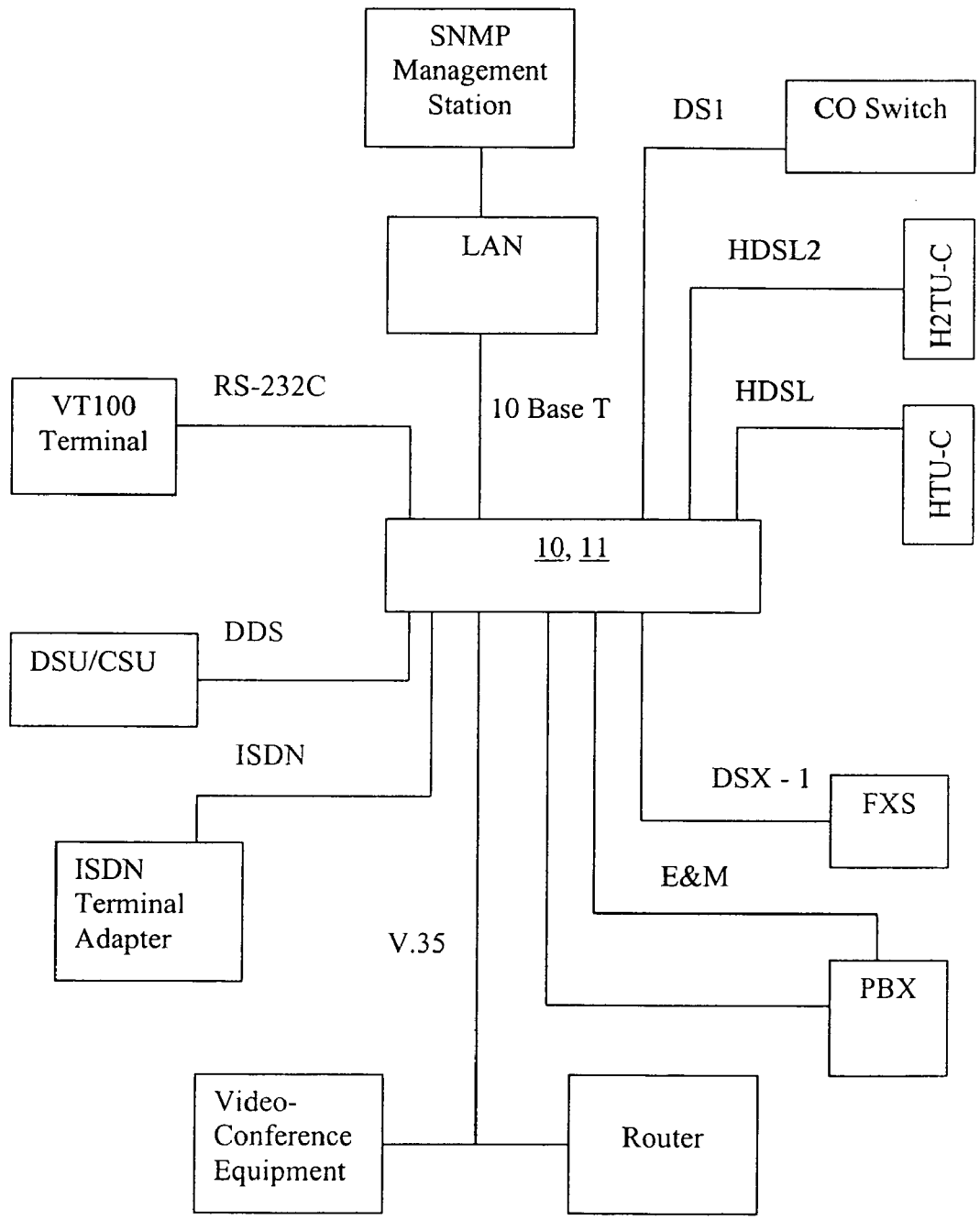
FIG. 1 is a block diagram that illustrates the various local loop access options that are selectable by the customer for using the system of the present invention to connect multiple voice and data communications devices at the customer premises to an incoming T1 line, further showing the system network and system management interfaces.

As a starting point in understanding the modular structure and operation of the integrated access system of the present invention, FIG. 1 conceptually illustrates the use of the system 10 in conjunction with various local loop, network, and management interfaces. More specifically, FIG. 1 shows a central office (CO) switch connected to the system 10 (and system chassis 11) through a DS1 (T1) line that terminated at the customer premises, which is where the system is installed. System functions are controlled by a Bank Controller Unit (BCU) that includes an RS-232 terminal interface accessible though a front panel connector, allowing the customer to control the system 10 from a VT100 terminal. FIG. 1 further shows the different types of voice and data communications devices that can be located at the customer premises and functionally connected to the T1 through one or more discrete access modules removably connected to system chassis 11. The customer premises equipment examples shown include: Up to 24 analog telephones (POTS) through one or more FXS/FXO access modules; a PBX through a system fractional T1 port; a router or videoconferencing system through a Nx56/64 access module to establish a V.35 DTE connection; an ISDN terminal adapter through a U-BRITE access module; and a DSU/CSU through a 4-wire DDS access module.

Figure 5:
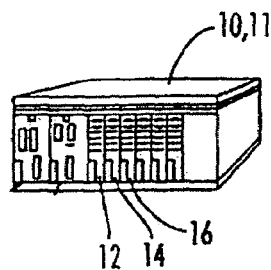
FIG. 5 is a front perspective view of the system chassis structure of this invention showing the front panel portions of the bank controller unit, power service unit, and further showing multiple access modules inserted into module slots in the system chassis.
Figure 6:
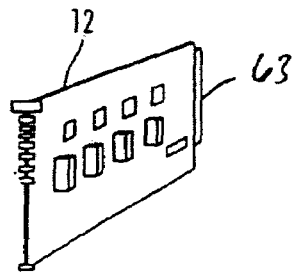
FIG. 6 is a perspective view of a single access module which could be received within the system chassis structure shown in FIG. 5.
Figure 7:
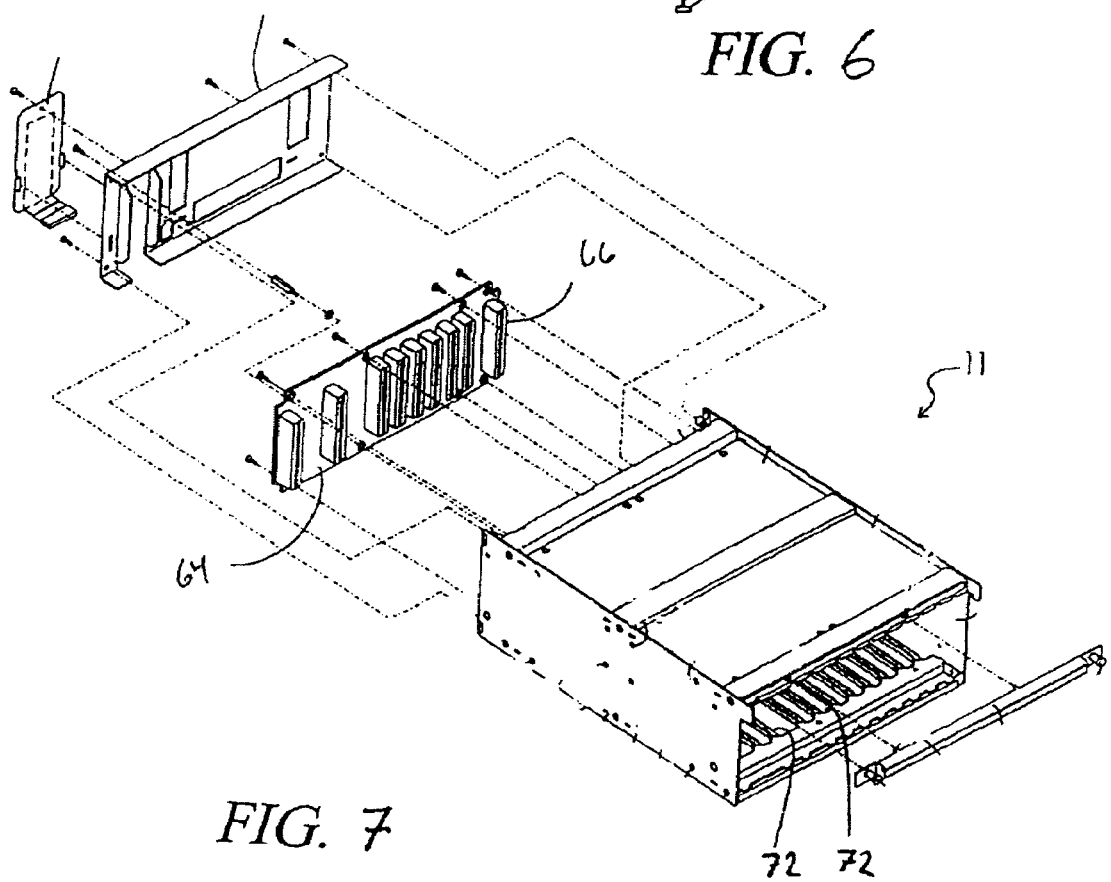
FIG. 7 is an exploded perspective view of the system chassis structure of FIG. 5.
Figure 9:
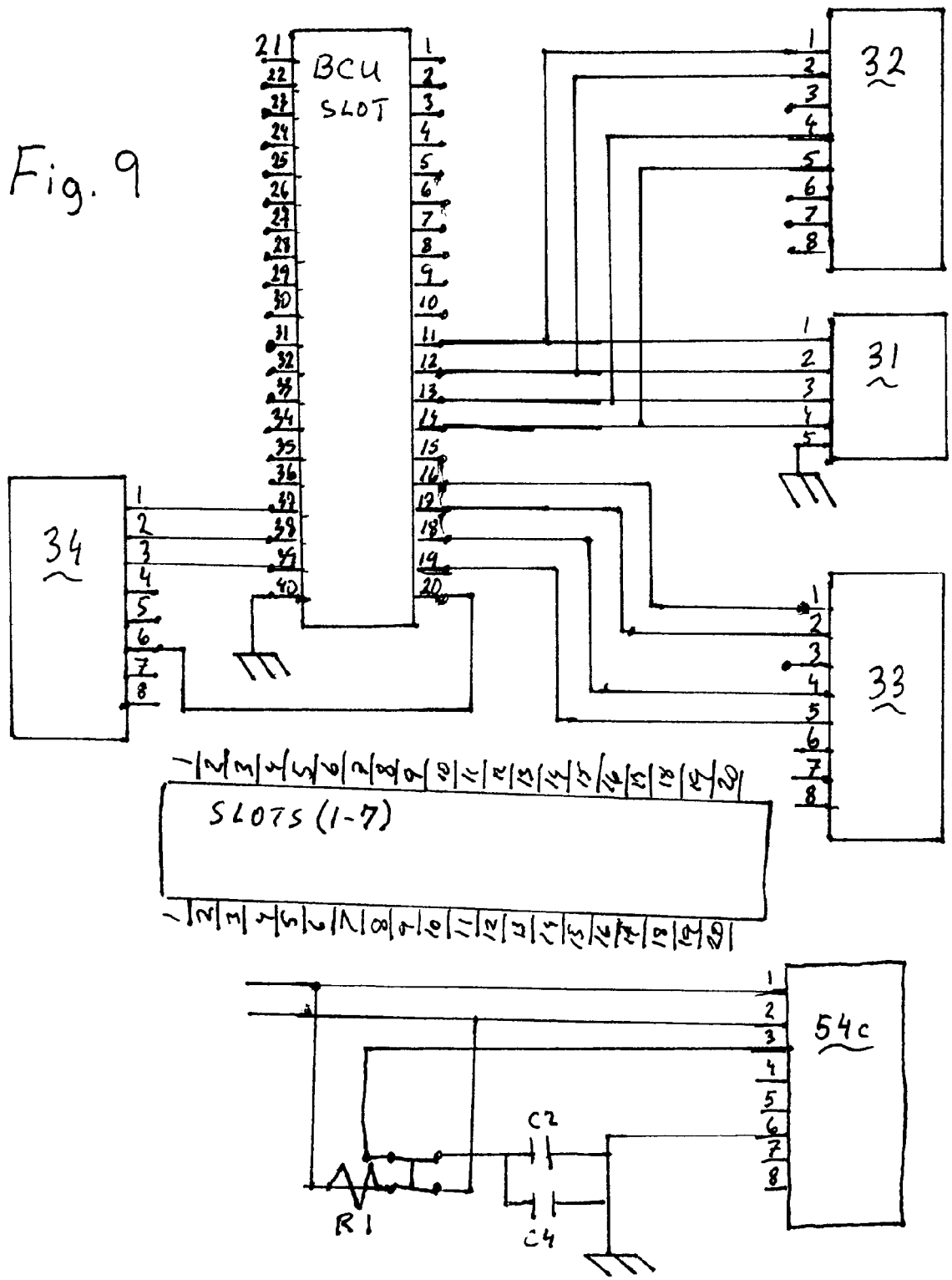
FIG. 9 is a schematic diagram of the electrical components of the system chassis, showing the electrical connections for the bank controller unit, the power service unit, and the chassis slots for accepting multiple access modules.

FIGS. 5, 6, and 7 provide more detailed information about the mechanical configuration of the system chassis 11 and the removable connection of the system modules 12, 14, 16. A series of backplane connectors 66 are arranged laterally along a rear panel 64 of chassis 11 to define a series of seven slots 72, 74 and a chassis backplane that is arranged electrically as shown in FIG. 9. Accordingly, each system module 12 (generically illustrated in FIG. 6) will be mechanically implemented on a circuit card on which the various module components are mounted, and including a rearwardly projecting edge connector 63 that mechanically and electrically engages a corresponding backplane connector 66 when the module is inserted into a slot 72.

The BCU and a Power Service Unit (PSU) are common system modules that are used in each application of the system 10 and occupy two of the chassis slots 72, electrically represented as BCU slot and PSU slot on FIG. 9. The seven remaining slots 72 (having slot backplane connectors 66 electrically represented on FIG. 9 as slots 1–7) are available to receive the various access modules 12, with slots 6 and 7 dedicated to accept a Nx56/64 DSU access module.

As shown on FIG. 9, the system chassis 11 further include external electrical connectors for interfacing with the network T1 or DS1 (connectors 31, 32), optional fractional T1 (connector 33) and a customer terminal interface (connector 34). Preferably the network and fractional T1 connectors 31, 33 are modular RJ-48C connectors. The pins on each of the slot 1–7 connectors shown on FIG. 9 (connectors 66 on FIG. 7) provide connections to the various system backplane power, Serial Peripheral Interface (SPI), and data buses used by the BCU, PSU, and access modules. These are described in more detail below.

Bank Controller Unit

The Bank Controller Unit (BCU) provides the control functions for the system 10 including backplane signal generation and control. The BCU controls all of the functions of the voice (FXS and FXO) access modules and provides supervisory control over the power service unit (PSU). The BCU also provides provisioning/test control for any "smart" access modules (i.e., access modules that have their own processor) such as the Nx56/64, OCU DP, DSO-DP or U-BRITE access modules. The FXS and FXO modules are sometimes referred to as "dumb" modules because they must rely exclusively on the BCU for control and supervision.

Figure 10:
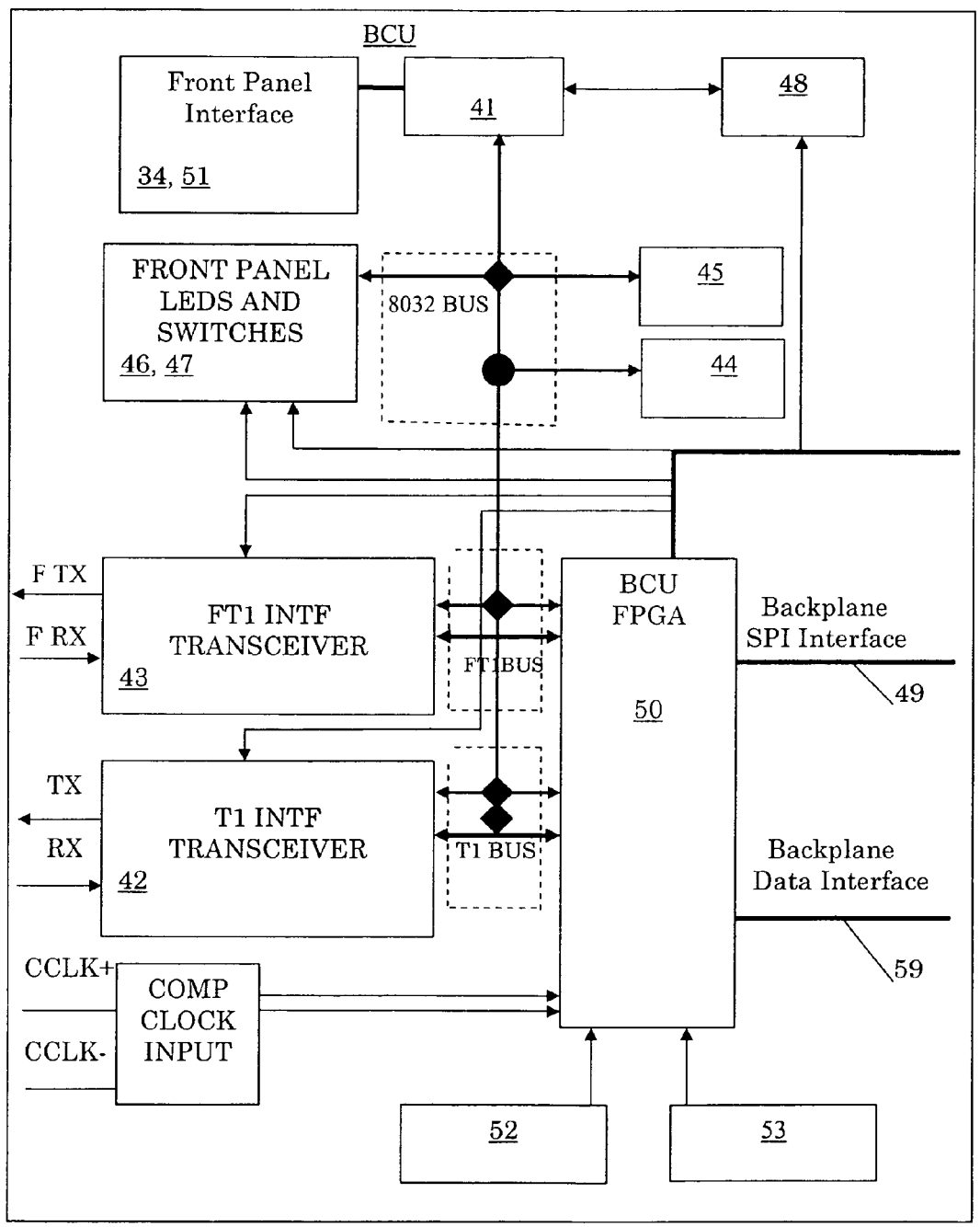
FIG. 10 is a block diagram of one embodiment of a bank controller unit for use in the system of the present invention.
Figure 11:
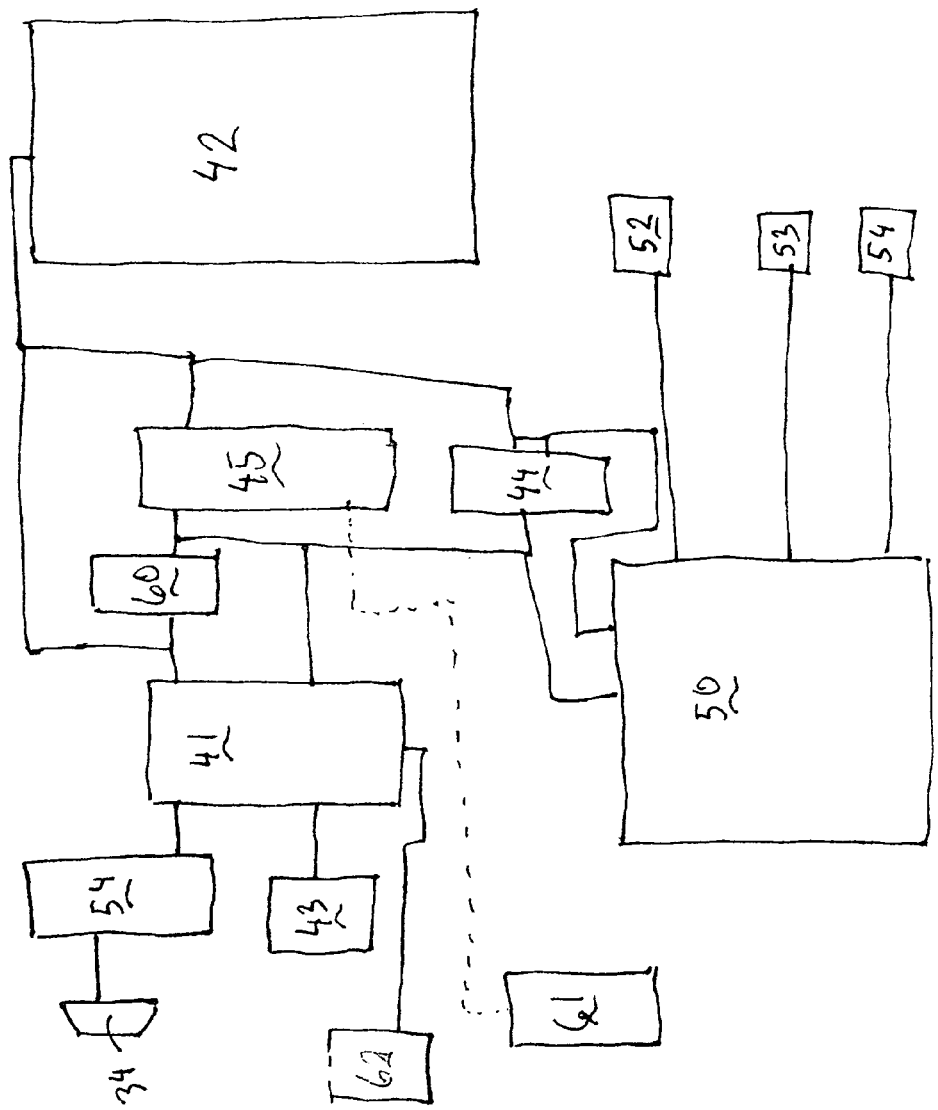
FIG. 11 is a block/schematic diagram of the Bank Controller Unit used in one embodiment of the system.

The basic architecture and interconnection of the components and sub-systems of the BCU are shown in FIGS. 10 and 11. The BCU is controlled primarily by an 8-bit 8032 microprocessor 41. The network T1 is connected through the T1 connector 31 (FIG. 9) to a T1 interface circuit 42 that includes a CSU. Interface transceiver 42 can be a conventional device such as a Dallas Semiconductor DS2152 integrated circuit. An optional fractional T1 interface transceiver (43 on FIG. 10 but not shown on FIG. 11) can also be included and can also be a DS2152 IC. System program and data memory is provided by 32 Kbytes of RAM 44, and 2 Mbytes of FLASH ROM 45, connected to processor 41 though octal latch 60. The BCU firmware provides all call control, test setup, and provisioning for the FXS and FXO access modules. Quad multiplexer 61 is used to download new programming to FLASH ROM 45. The BCU can be provisioned via DIP switches 46 or via the terminal interface through the front panel DB-9 admin connector 34 (FIG. 9). Bit and byte clock is also available via the DB-9 front panel connector 34, compatible with a TPI 108/109 test set.

The BCU also drives status LED's 47 on the front panel to indicate the state of the main network T1 interface (and fractional T1 if installed). T1 performance monitoring information is maintained and processed by the BCU for the network T1 interface (and optionally for the fractional T1). Performance monitoring information is available to the network via the FDL in ESF mode and through the terminal interface. Preferably, the BCU will include 4096 bits of non-volatile storage in an EEPROM 48. Circuit 62 provides watch dog and power reset functions.

Each module slot 74 in the chassis 11 can be selected by the BCU over SPI interface 49. In a preferred embodiment, there are seven different module selects (PSU & Slots 1–6) as well as two additional selects that are common to each slot for selecting different registers/chips on a given access module. The BCU controls all aspects of operation of the system 10. As mentioned above, the system services provide by the BCU include: network and fractional T1 control; access module control; alarm control; a user interface; and a backplane control. A field programmable logic array (FPGA) 50 in the BCU provides the clock generation, chip select, and backplane interface functions. The backplane data bus/interface 59 also connects the FPGA 50 to the other system modules. MCAN oscillators 52,53 provide timing signal for FPGA 50. The BCU also includes a composite clock input to the FPGA 50. A composite clock input/output termination 54c (FIG. 9) is provided on the system chassis 11.

BCU Network and Fractional T1 control

The BCU operates both the network and fractional T1 interfaces. Performance monitoring and alarm information is maintained for both the network and fractional T1 services. The BCU supports many different T1 including Extended Superframe (ESF), Superframe (SF), TR-08 with alarm-16, and TR-08 with alarm-13. These formats can run over either an AMI or B8ZS line code. The network and fractional T1 ports run independently of each other.

The BCU maintains performance information for both the network and fractional T1 interfaces for the current and most recent twenty-four hour period. The parameters stored are Errored Seconds (ES), Severely Errored Sec (SES), Severely Errored Frame (SEF), Frame Sync Bit Errors (FS), Line Code Violation (LCV), and Slip Event (SLP).

Access Module Control

In accordance with one of the novel aspects of this invention, the BCU can concurrently control and supervise many different types of access modules 12, 14, 16 including FXS/DPO, quad FXO, Nx64/56, OCU DP, DSO DP, and U-BRITE (ISDN) modules. Conventional components and circuits used to interface and connect voice and data customer premises equipment to a network T1 are well known and available. Such circuits and components can be used in the system of this invention if modified to include a backplane (e.g., edge) connector through which physical mounting, power distribution, and signaling in conformity with the bus structure of the system backplane can be provided. In addition, the access modules 12 will typically include a bus transceiver to interface the backplane bus with input/output ports by way of a module signaling bus. Bus control logic unit is coupled to the control bus portion of the backplane and interfaces the control signals generated by the processor on the BCU with various processor-controlled circuit components of a respective access module. One example of an access module having a modular architecture adaptable to the system of this invention is described in applicant's U.S. Pat. No. 6,018,529 which is incorporated herein by reference. Details of the control and backplane signaling between the BCU and various access modules are provided below. Each access module type communicates a unique identification code to the BCU so that the BCU can automatically configure the system to provide access to the network T1 and allocate bandwidth to the customer premises device connected to that module.

Control of Quad FXS/DPO Modules

All aspects of a quad FXS/DPO access module are controlled via the BCU. Each individual port in the module is controlled independently of the others. The aspects controlled and various options are: signaling modes (FXS Loop Start, FXS Ground Start, TR-08 Single Party, TR-08 Universal Voice Grade, Tandem (E&M) and DPO); transmit Attenuation (0 to 9 dB); 2 wire line impedance (600 ohms; 900 ohms, 600 ohms+2.16 uf; 900 ohms +2.16 uf; and auto).

The wire line impedance can be auto discovered by the BCU which will insert proper filter coefficients for a particular loop resistance. The BCU also automatically sets the transmit and receive attenuation to 6 dB if the loop is short and 3 dB if the loop is long.

Control of Quad FXO Modules

All aspects of the quad FXO are controlled via the BCU. Each individual port in the quad port module is controlled independently of the others. The aspects controlled and various BCU options are: signaling modes (FXO loop start and FXO ground start); transmit attenuation (0 to 9 dB); and receive attenuation (0 to 9 dB).

Control of Smart Access Modules

Smart access modules that require their own processor get provisioning through the BCU. The BCU communicates to the smart access modules via the proprietary AAMPC2 protocol over which is passed access module type, timeslot, configuration, status and test information. The smart access modules that are supported are the Nx56/64, OCU DP, DSO DP, Dual DSU DP, and U-BRITE.

Alarm Control

The BCU controls the system alarms. System alarms are any event that causes an interruption of service. These include T1 failures, ring generator failure, and service affecting T1 tests. The BCU communicates these system alarms via the alarm relay contacts found on the Power Service Unit (PSU). The alarm relay contacts are referred to as audible and visual alarm contacts. The alarm relay contacts are referred to as audible and visual alarm contacts. The alarm relay contacts connect to wire wrap posts on the backplane that may be connected to a variety of network alarm notification equipment. An alarm will cause the BCU to close the alarm contacts and illuminate the alarm LED on the PSU front panel. Pressing the Alarm Cut Off (ACO) switch on the PSU front panel during an alarm condition will cause the audible alarm contacts to open, thus silencing any connected notification equipment. Also, the PSU alarm LED will blink to indicate that the ACO switch has been pressed.

Customer Interface

The BCU provides the customer a terminal interface via an RS232 terminal interface circuit 51 (FIGS. 10, 11) connected to the front panel DB9 admin connector 34. The terminal interface uses a VT100 terminal emulation operation at 9600 baud. All configuration and control for the entire system 10 can be controlled through the terminal interface at the admin connector 34. All DIP switch 46 settings can be overridden through the customer terminal interface.

Backplane Control

The BCU is responsible for generating the backplane signals that are used by all access modules in the system. The signals available at the corresponding pins on are as follows:

| Pin | Name | Function |
| --- | --- | --- |
| 1. | CCLK+ | Input, composite clock from office |
| 2. | CCLK− | Input, composite clock from office |
| 3. | Dig GND | Digital ground |
| 4. | MCLK | Output, 2.048 MHz system clock |
| 5. | Dig GND | Digital ground |
| 6. | 20HZSYA | Input, 20 Hz pulse aligned to ring generator on PSU |
| 7. | SPI_CLK | Output, SPI clock |
| 8. | Dig GND | Digital ground |
| 9. | SPISB | Output, SPI control line "B" |
| 10. | SEL_PAU | Output, control line used to select PSU card |
| 11. | T1R1-I | Input, Network T1 Ring1 lead |
| 12. | T1T1-I | Input, Network T1 Tip1 lead |
| 13. | T1R-O | Output, network T1 Ring lead |
| 14. | T1T-O | Output, Network T1 Tip lead |
| 15. | Dig GND | Digital ground |
| 16. | FT1R-O | Output, Fractional T1 Ring lead |
| 17. | FT1T-O | Output, Fractional T1 Tip lead |
| 18. | FT1R1-I | Input, Fractional T1 Ring1 lead |
| 19. | FT1T1-I | Input, Fractional T1 Tip1 lead |
| 20. | ERX− | Not used, No connect |
| 21. | −5 V | −5 volt supply |
| 22. | +5 V | +5 volt supply |
| 23. | +3.3 V | +3.3 volt supply |
| 24. | FSYNC | Output, 8 kHz T1 frame sync pulse |
| 25. | RPCM | Input, Receive PCM data from backplane |
| 26. | TPCM | Output, Transmit PCM data from network |
| 27. | Dig GND | Digital ground |
| 28. | SPIOUT | Input, SPI data from access modules |
| 29. | SPIIN | Output, SPI from BCU to access modules |
| 30. | SPISA | Output, SPI control line "A" |
| 31. | SEL1 | Output, Control line used to select access module in slot #1 |
| 32. | SEL2 | Output, Control line used to select access module in slot #2 |
| 33. | SEL3 | Output, Control line used to select access module in slot #3 |
| 34. | SEL4 | Output, Control line used to select access module in slot #4 |
| 35. | SEL5 | Output, Control line used to select access module in slot #5 |
| 36. | SEL6 | Output, Control line used to select access module in slot #6 |
| 37. | ETX+ | Not used, No connect |
| 38. | ETX− | Not used, No connect |
| 39. | ERX+ | Not used, No connect |
| 40. | Frame GND | Frame ground |

Customer Selectable Features (Daughter PCB DIP switches)

The DIP switches 46 allow the customer to select form the following system features: T1 type (B8ZS, AMI); T1 framing (ESF, SF, SLC-96 w/16 bit alarms); CSU latching loopbacks enable/disable; bank timing mode; external timing (office composite clock); local timing, loop timing; and DS1 line build out (0 dB, −7.5 dB, −15dB, −22.5 dB).

Front Panel LED's 47

| T1 and Optioning LED's | |
| --- | --- |
| Display | Interpretation |
| Network T1 | Red, Main T1 and Red Alarm |
| | Yellow, Main T1 receiving yellow alarm from remote T1. |
| | Green, Main T1 normal (all alarms cleared) |
| Fractional T1 | Red, Fract T1 in Red Alarm |
| | Yellow, Fract T1 receiving yellow alarm from remote T1 |
| | Green, Fract T1 normal (All alarms cleared) |
| | Off, No channels allocated to Fract T1. |

The system BCU includes a Field Programmable Gate Array (FPGA) 50 (FIGS. 10 and 11) that is programmed to provide the following functionality for the BCU: interface to the access modules via the SPI interface over the backplane; timing generation in local, loop, and external timing modes; dialtone an ringback tone generation for Tandem 4ESS applications; multiplexing of backplane data with fractional T1 data; generation of bit clock and byte clock for BCU front panel clock access; and generation of chip selects for T1 interface transceiver 42, FT1 interface transceiver 43, front panel LED's 47, and switches 46.

Each access module slot 72 in the system chassis 11 can be selected by the BCU over SPI interface 49. There are 7 different Card Selects (PSU & Slots 1–6) as well as two additional selects that are common to each slot for selecting different registers/chips on a given access module. The following SPI timing diagrams are provided for reference only. The actual timing is ultimately controlled by the processor 41 on the BCU. The SPI_IN side is very flexible and can adjust for clocking data in/out on either edge of the SPI_CLK depending on the needs of the access module.

Timing Diagram for SPI Receive Status Interface with all Access Modules ( 8 Bits) Data coming from Access Module
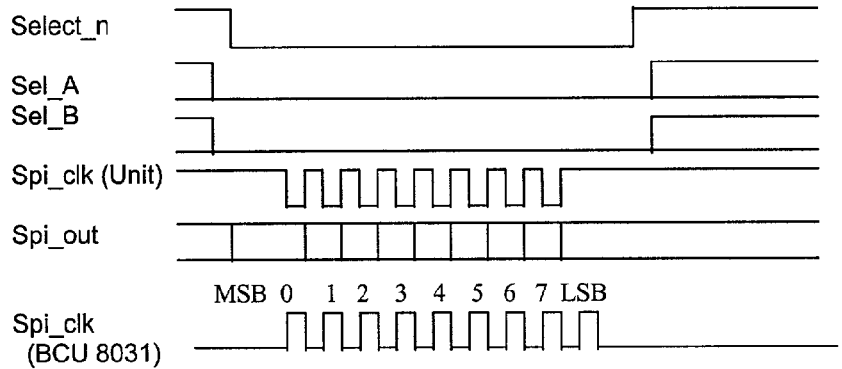
Timing Diagram for SPI Receive Interface from Smart Access Modules for Provisioning (9 Bits) Data going into Access Module
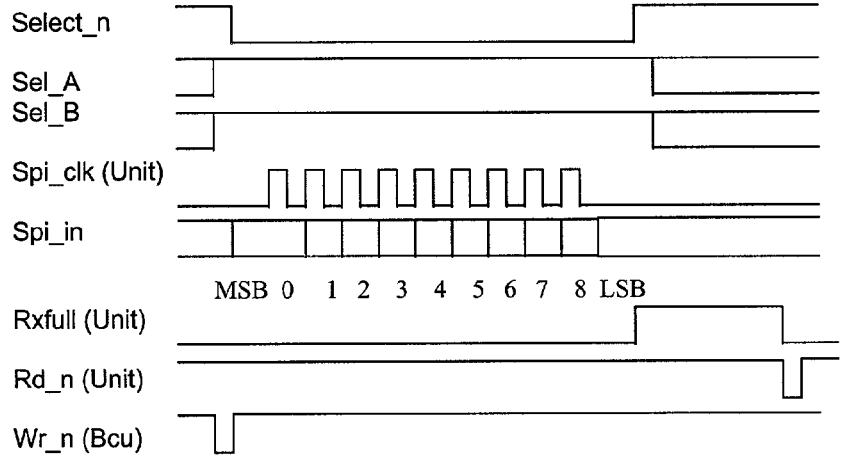

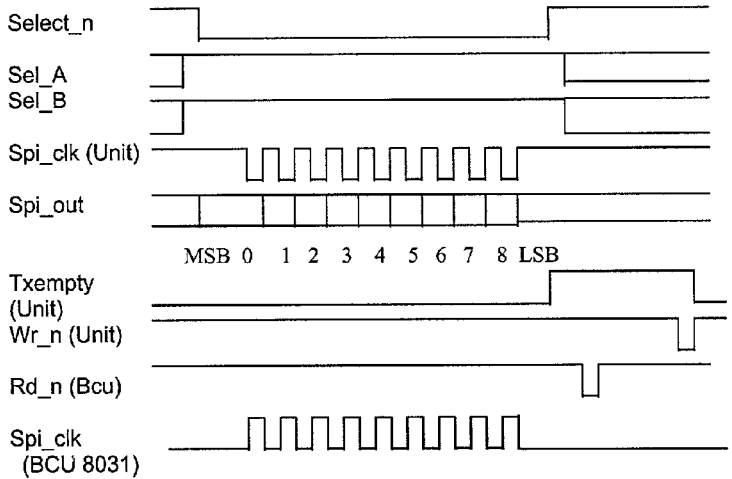
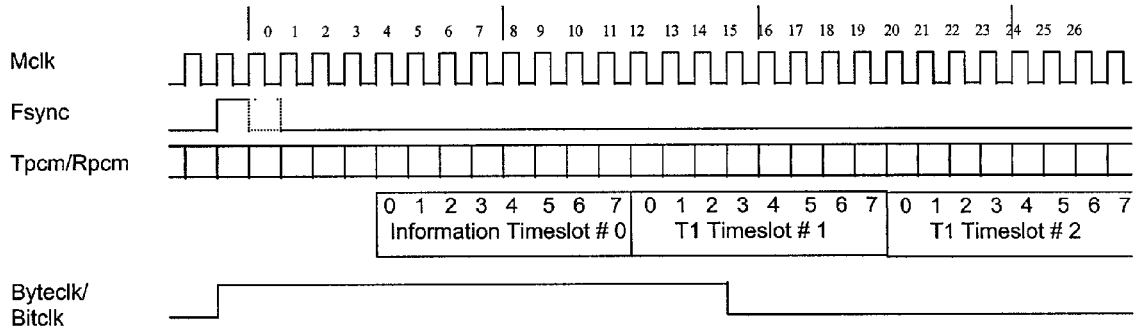

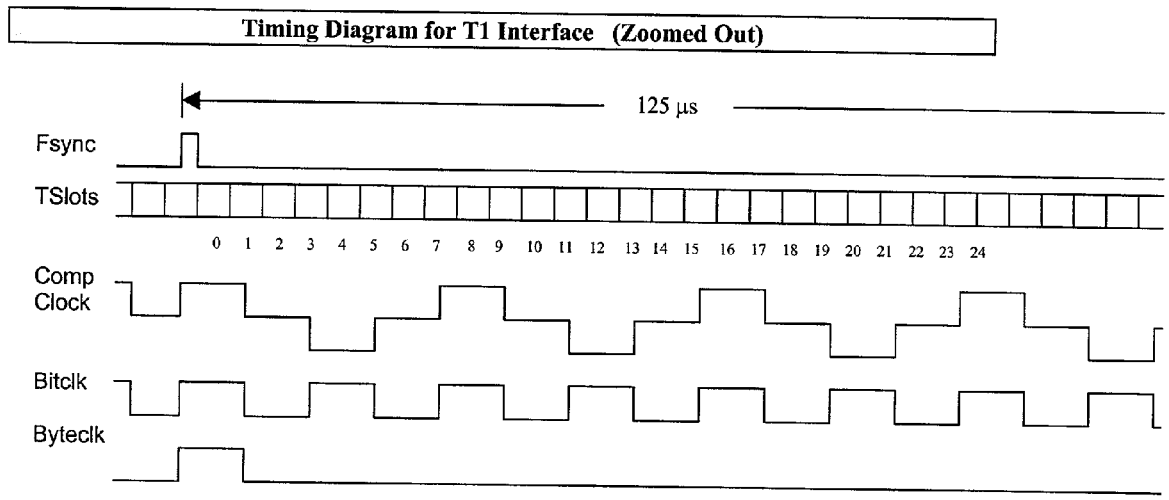

Power Service Unit

The power service unit (PSU) receives power (40–56 VDC) from the network T1 (or optional AC power supply as described below) through a −48 VDC connector and converts and conditions it for use by the system modules. Preferably, the PSU can provide −48 VDC, −24 VDC, −7 VDC, +3.3 VDC, +5 VDC, and +12 VDC for use by the various system components. The PSU also has an integral 20 Hz ring generator for use by the telephone circuits connected to the FXO/FXS access modules.

Foreign Exchange Office and Foreign Exchange Subscriber Modules

The Foreign Exchange Office (FXO) and Foreign Exchange Subscriber (FXS) modules are used in the system provide analog voice extension. The two modules may be used in a back-to-back configuration (FIG. 4(a) where the FXO interfaces to the central office switch, and the FXS interfaces to the customer's telephone. The more common configuration (FIG. 4(b) uses and FXS only, with the T1 interfacing directly to the CO switch (TR-08 mode). Up to six quad FXO/FXS access modules may be deployed in the system allowing a maximum of 24 analog voice lines.

Four analog voice ports on the FXO/FXS access modules prove four individual connections to the switch or customer telephones. The Modules support standard loop start, ground start, and TR-08 signaling options. In addition to these signaling states, the FXS module supports E&M to wink start, E&M to ground start, and immediate start signaling states. Direct Inward Dial (DID) applications are supported with the Dial Pulse Terminate (DPT) and Dial Pulse Originate (DPO) functionality found on the FXO and FXS, respectively.

A novel feature of the FXS access module is the automatic gain provisioning option. This feature automatically adjusts the gain for short and long loops, therefore expediting installation time and decreasing provisioning errors. The auto gain feature may be overridden as a software function via the craft interface.

For further flexibility, the FXS may be deployed on long loops, up to 1200 ohm impedance. V.90 modems are supported by the FXS module.

Both of these voice access modules are hot swappable and accessible at all times. An individual access module may be replaced without disrupting other units. The quad (4-circuit-per-access module) design ensures a maximum of only four analog circuits are affected when replacing an access module.

Figure 12A:
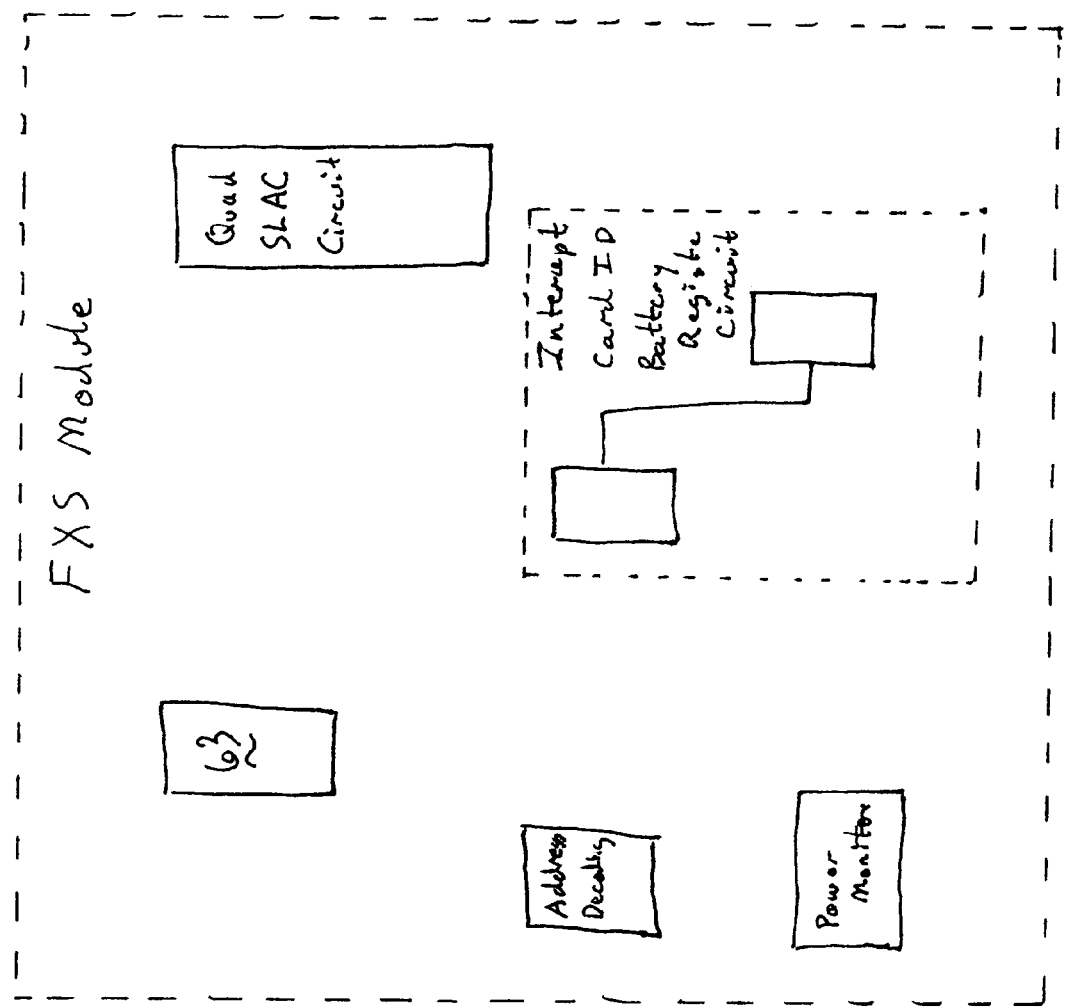
FIGS. 12(a), 12(b), and 12(c) are collectively a block/schematic diagram of a quad FXS access module that can be used in an embodiment of the system of this invention.
Figure 12:
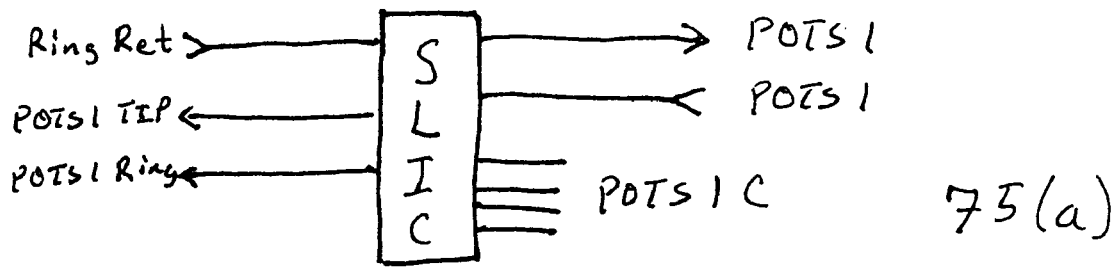
Figure 12:
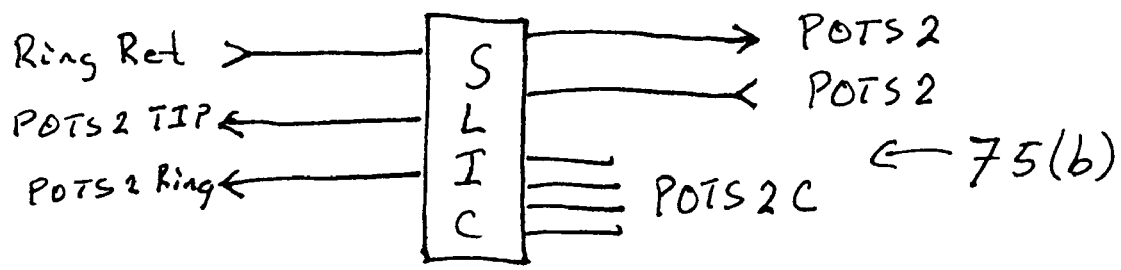
Figure 12:
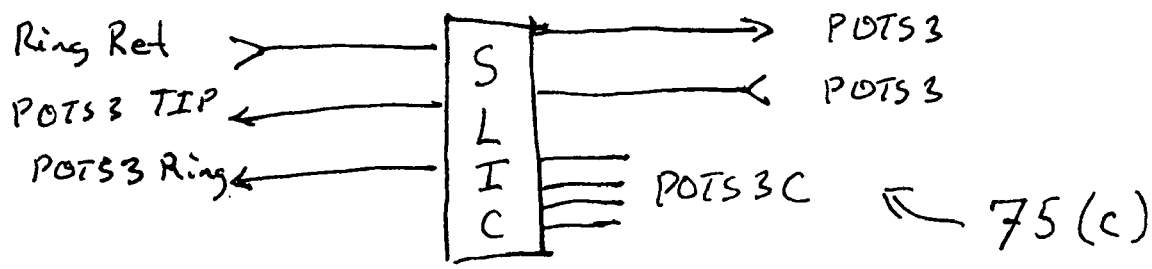
Figure 12:
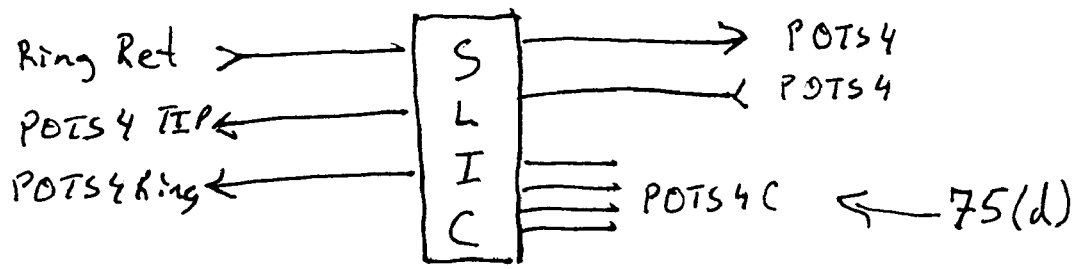

Further detail about one embodiment of an FXS module usable in the system 10 is illustrated in FIGS. 12(a)–12(c). Looking first at FIG. 12 (a), the FXS module includes a quad subscriber line audio processing circuit. (SLAC) which can be a conventional integrated circuit such as the AM79Q021 from Advanced Micro Devices. The interrupt, card (module) ID, and battery register circuit (FIG. 12(a)) allows the module to identify itself to the BCU whereby the BCU will query the module for configuration information. Also include, again as shown on FIG. 12(a), are an address decoding section, a power monitor, and a module backplane (edge) connector 63.

Figure 3:
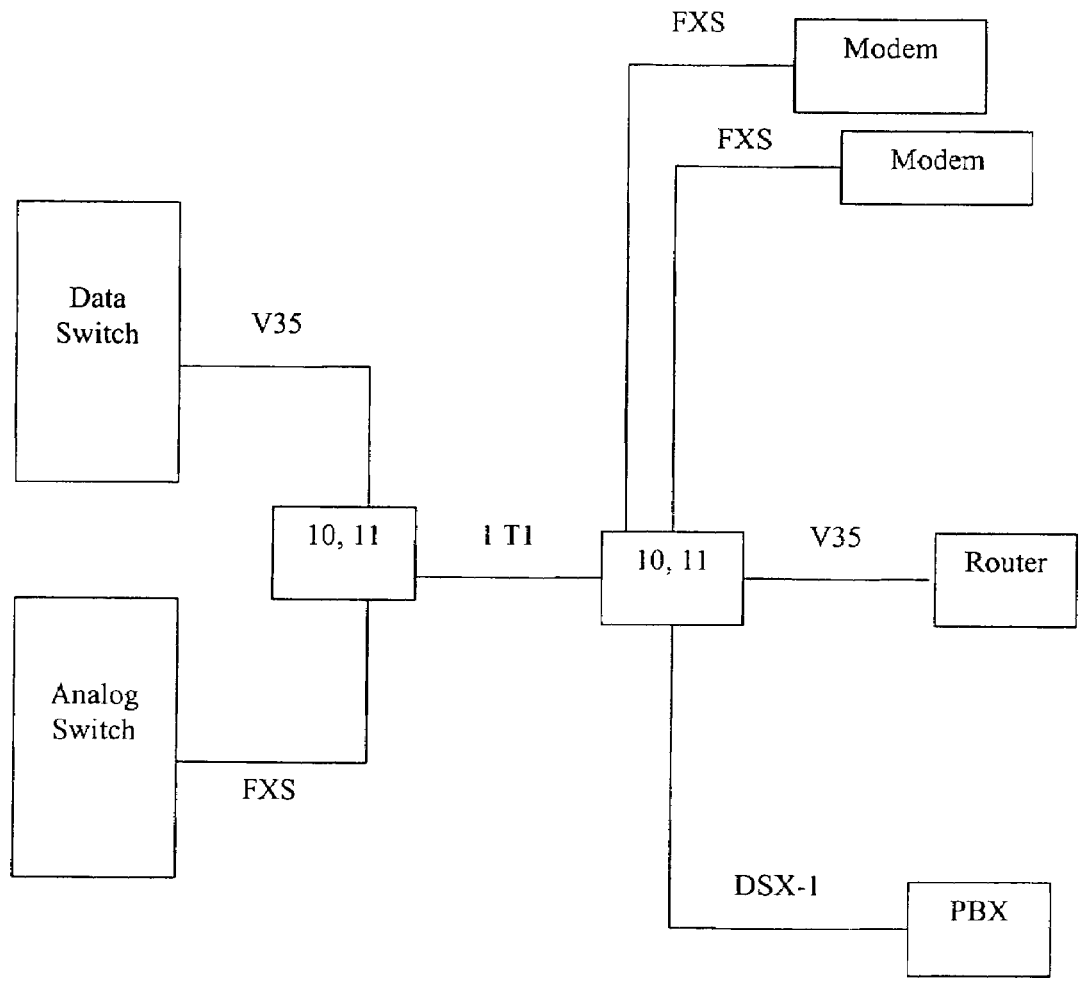
FIG. 3 is a block diagram that illustrates the interconnection over a T1 of two systems, with each system providing an interface to diverse customer premises voice and data communications devices.

FIGS. 12(b) and 12(c) show the four identical analog voice port circuits 75(a)–(d) which provide the direct interface to four POTS devices such as a telephone or modem (FIGS. 1 and 3). The core functionality of each voice port circuit 75 is provided by a subscriber line interface circuit (SLIC), such as an AMD 79489. Again, the configuration and operation of such circuits is conventional and well known to those of skill in the art.

Figure 4A:
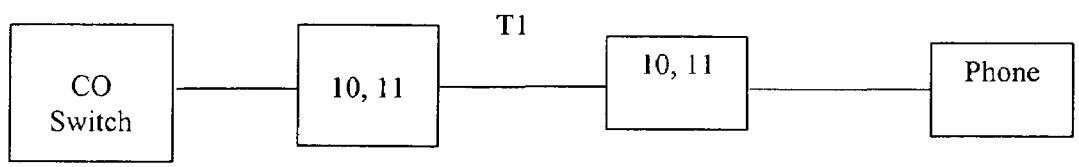
FIG. 4(*a*) is a block diagram showing use of the system of this invention to connect a conventional analog telephone (POTS) at the customer premises to a central office switch through an incoming T1 line by using Foreign Exchange Office (FXO) and Foreign Exchange Subscriber (FXS) access modules.
Figure 4B:
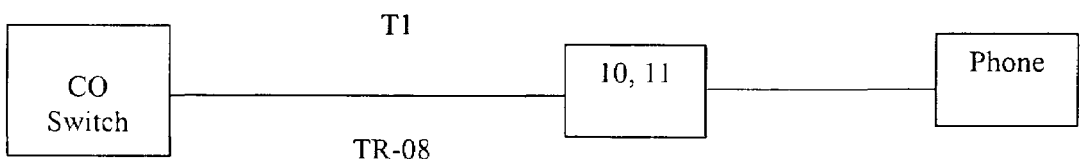

FIG. 4(a) shows use of a system 10 with an FXS module on a customer end of the T1 and a second system 10 with an FXO module at the central office end. FIG. 4(b0 shows a system 10 with an FXO module at the central office end. FIG. 4(b) shows a system 10 with an FSX module connecting the customer premises POTS telephone to the central office switch with the T1 operating in the TR-08 mode. FIG. 3 shows a pair of systems 10 connected to each other over a T1 to provide voice and data communications at each end.

Nx56/64 Access Module

Figure 2:
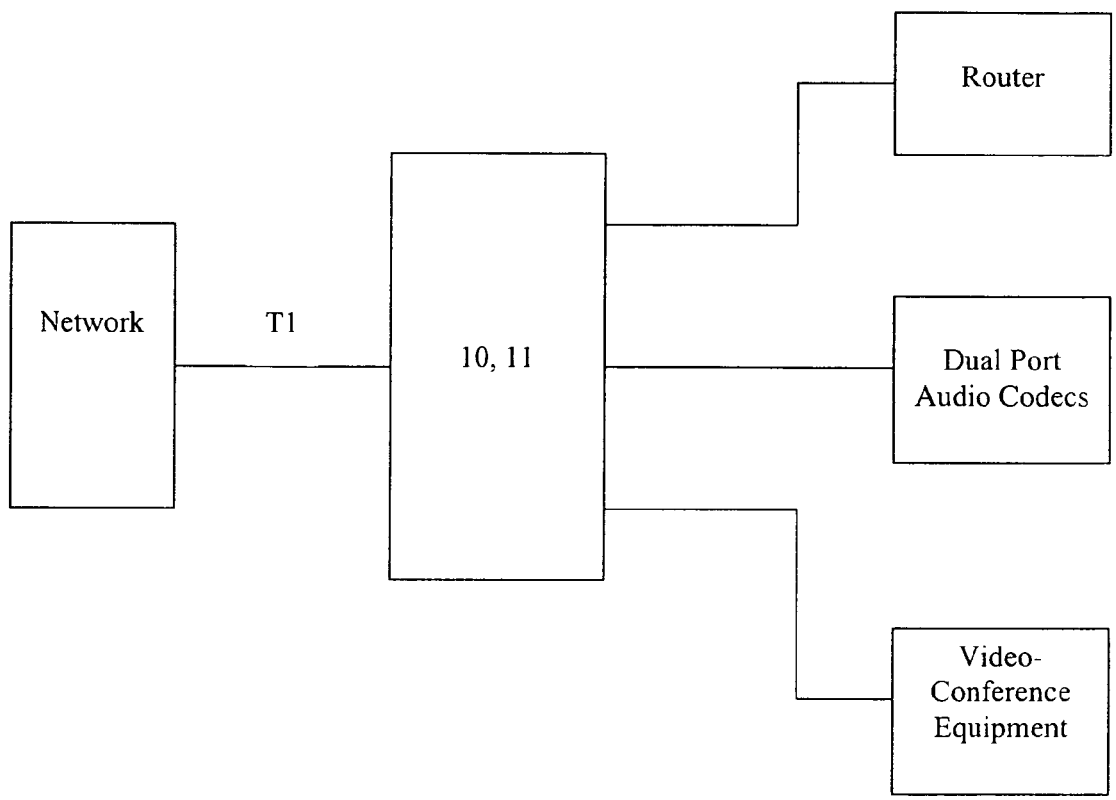
FIG. 2 is a block diagram that illustrates the use of a Nx56/64 DTE access module in the system of this invention to connect customer premises V.35 DTE devices to the provider network through an incoming T1 line.

The Nx56/64 access module is used in the system to provide a programmable data interface to various types of networking equipment. Some common applications for the Nx56/64 module include a high-speed data interface for routers, audio broadcasting systems, and video-conferencing systems (FIG. 2). Designed to interface with standard V.35 DTE connectors on routers, bridged, codecs and switches, the system Nx56/64 module provides synchronous data tat rates from 56 kbps to 1.536 Mbps. To aid in setup and troubleshooting, the module provides V.54 local and remote loopbacks and built-in test patterns.

The Nx56/64 access module is configured through the BCU terminal interface. The Nx56/64 module occupies slots 6 and 7 in the system chassis 11. The physical interface to the module is on the rear of the system chassis in the form of a V.35 Winchester female connector (not shown).

Basic Rate-One Transmission Extension (U-BRITE) ISDN Access Module

Integrated services digital network (ISDN) communication systems enable telephone service providers to supply multiple types of signaling channels from a central office to a network T1 interface at a customer premises site. An example of a reduced complexity extended distance ISDN communication network can comprise a T1 through which the network provider central office (CO) at one end of the T1 transmits and received signaling traffic with respect to a customer premises communications device serviced by the system. The central office includes a central office switch that contains a plurality of line termination circuits (or line access modules), each of which is coupled over a local loop (twisted tip/ring pair) to local customer site.

One embodiment of a U-BRITE access module that can be adapted for use in the system 10 of this invention is described in applicant's U.S. Pat. No. 6,018,529, which is incorporated herein by reference. However, in a preferred embodiment of the system the U-BRITE access module, unlike that disclosed in the '529 patent, will be "smart" (having its own processor and will use a serial backplane interface compatible with BCU architecture disclosed herein.

AC Power Supply

Figure 8:
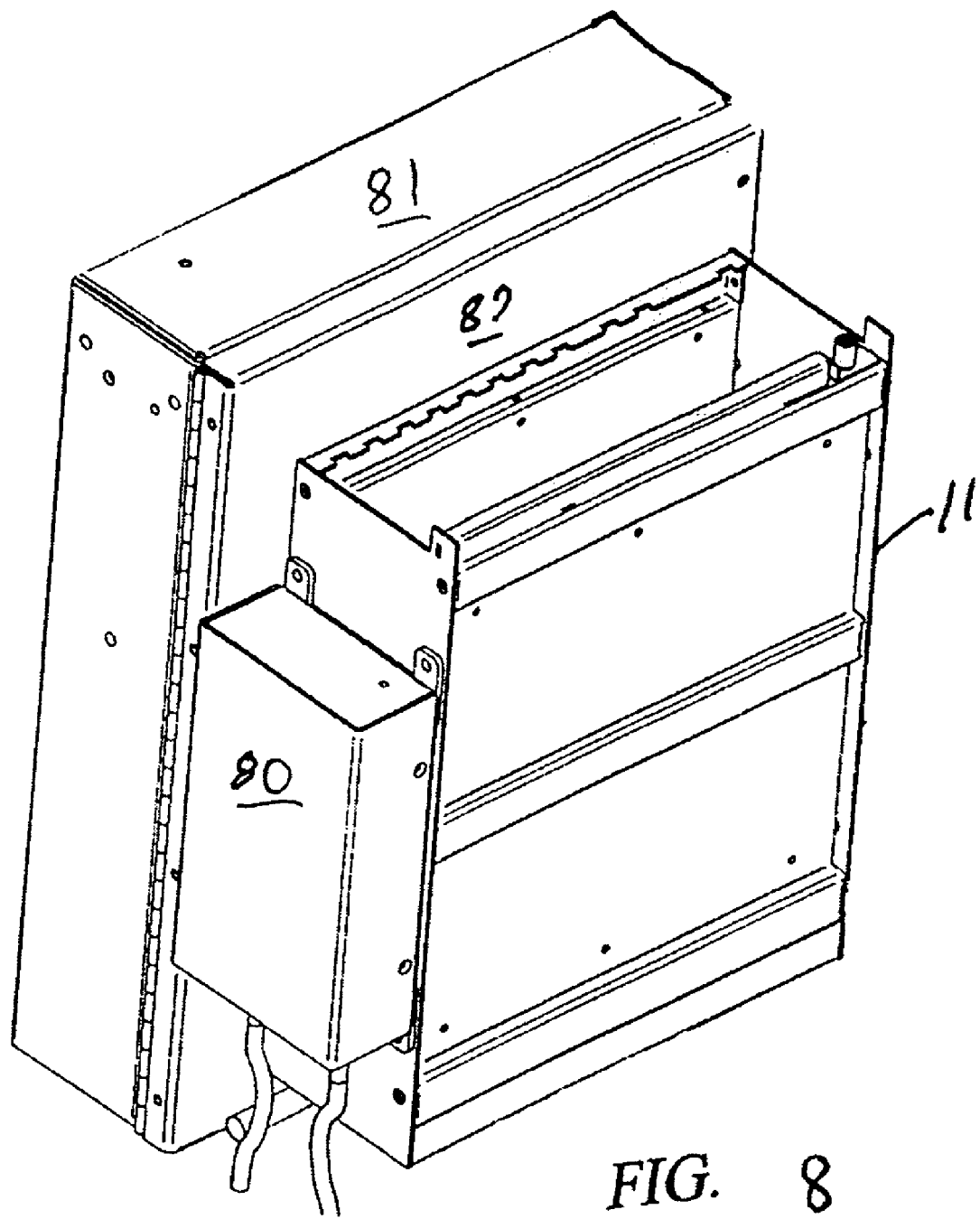
FIG. 8 is a perspective view of the system chassis structure of FIGS. 5 and 7 mounted to an optional battery box and further showing and optional AC power supply mounted to the side of the system chassis.

Although the system 10 can be powered (via the PSU) from the central office supplied −48 VDC, some customer applications warrant installation of a separate enclosure 80 and mounted to an exterior side wall of the system chassis 11, as shown in FIG. 8. A further option is to include battery back-up for the system and, for convenience, mounting the system chassis 11 directly to the hinged door 82 of the back-up enclosure 81.

As discussed above and illustrated in FIG. 13, many prior art battery back-up systems utilize separate powering channels for supplying load current to an electronic system and supplying charging current to the battery. The battery charge channel is generally designed to be constant current or current limited and the power circuit is designed to have enough power capability to fully power the load and charge the battery simultaneously. However, if the load drawn by the electronic system statistically varies such that the average load over a 12 or 24 hour period is much less (half) than the peak load during the same interval then the power to charge the battery can be incorporated in the difference between the peak and average load of the electronic system. Such is the case of a telecommunications system that provides (in addition to voice and data signaling) ringing power to multiple voice phone lines. The ringing signal is sinusoidal (or trapezoidal) with a 20 Hz frequency (for domestic USA) and is typically applied to each phone line with a cadence (2 seconds on and 4 second off is the common). Further, the demand for ringing is highly statistical.

Figure 13:
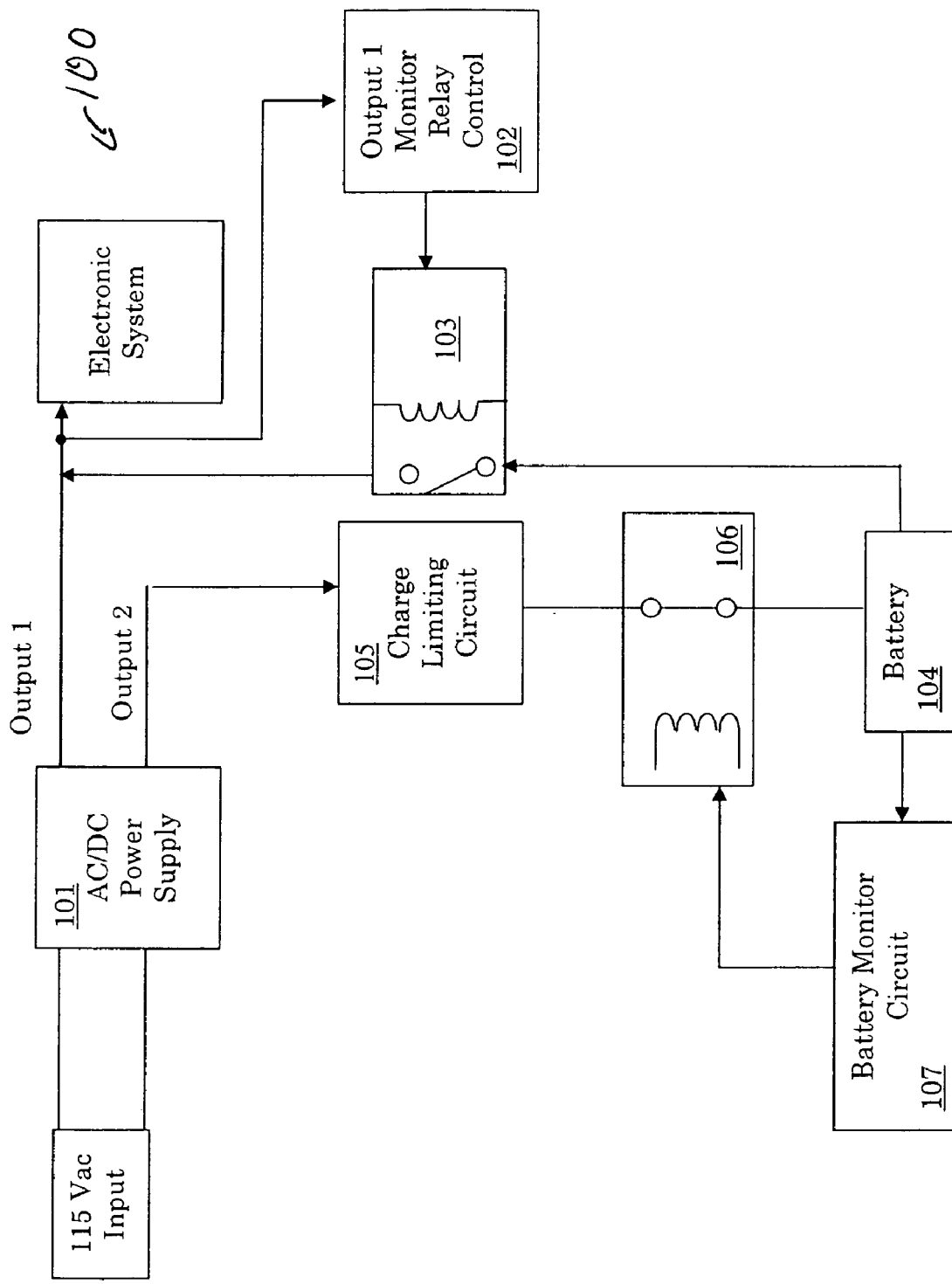
FIG. 13 is a block diagram of a typical AC power supply combined with a battery back-up system that is used in the prior art to power communications devices and systems, including T1 integrated access systems.

In addition to the power consolidation described above, if tile separate charge control circuitry shown in FIG. 13 can be folded into the power supply circuit than the overall system cost and complexity is reduced resulting in a low cost, minimum size, maximum efficiency solution. The novel AC power supply and battery back-up system 200 shown in FIGS. 14 and 15 provides such a solution and can be used to power the system 100 of this invention.

Figure 14:
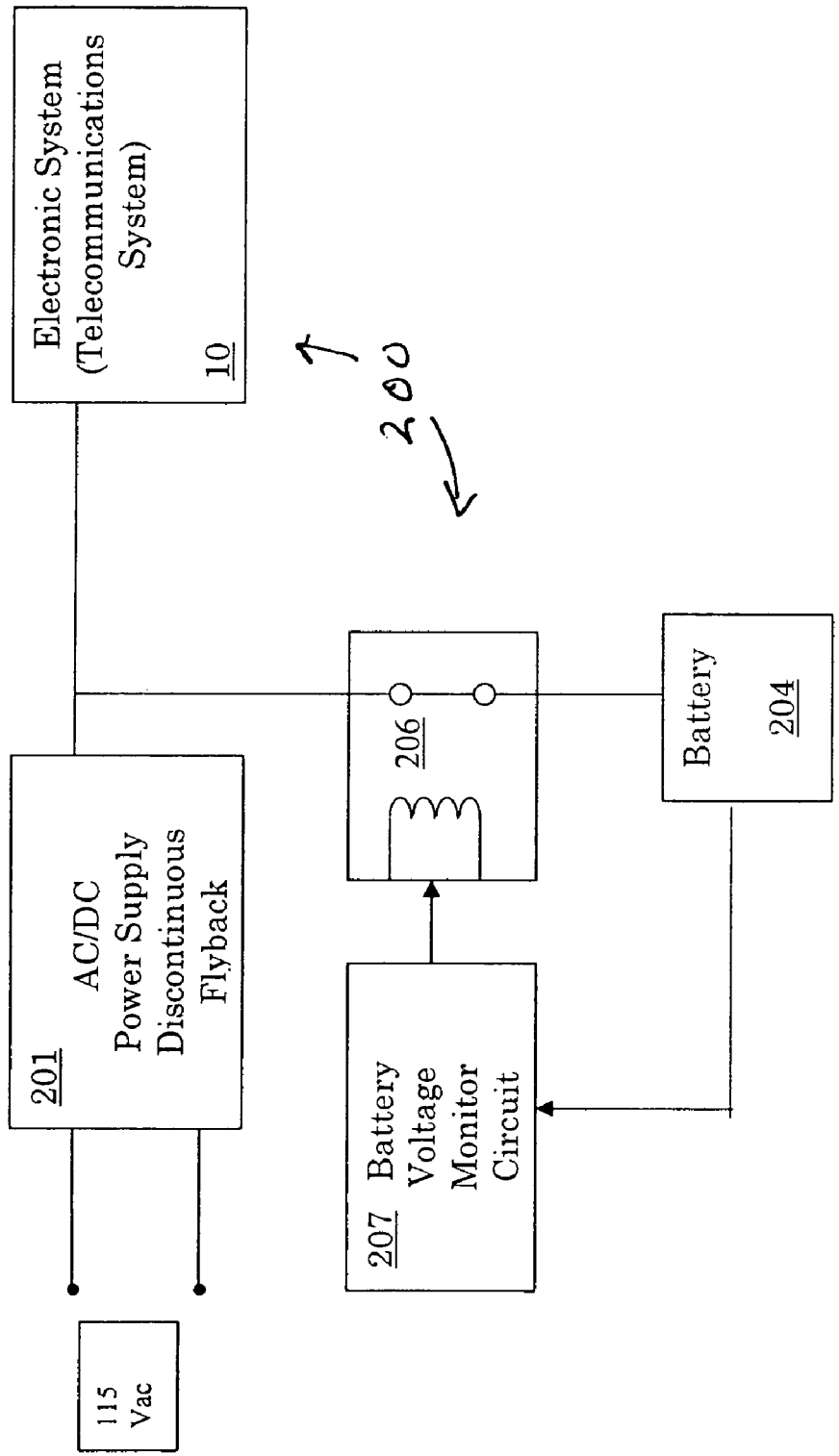
FIG. 14 is a block diagram of the AC power supply and battery back-up system used in the system of the present invention.

Looking first at FIG. 14, a rectification and power conditioning section 201 has an AC input connected to the 115 VAC utility network and a single DC output connected to power the system 10. The DC output is also connected to a battery 201 (which operates in a float mode) through a normally closed relay circuit 206. The battery 204 receives whatever power is left over from the rectification and power conditioning stage 201 as well as to the relay 206. The monitoring circuit 207 protects the battery 204 by causing the relay 206 to open when the battery voltage goes below a pre-set level. The telecommunication system 10 is designed to operate over the full battery voltage range (40V to 54V). Therefore, in one embodiment of the system 100, this pre-set level is 40 VDC. In the system 200 for FIG. 14, the battery 204 is connected directly across the power supply output lines and no additional charge control is required.

Figure 15:
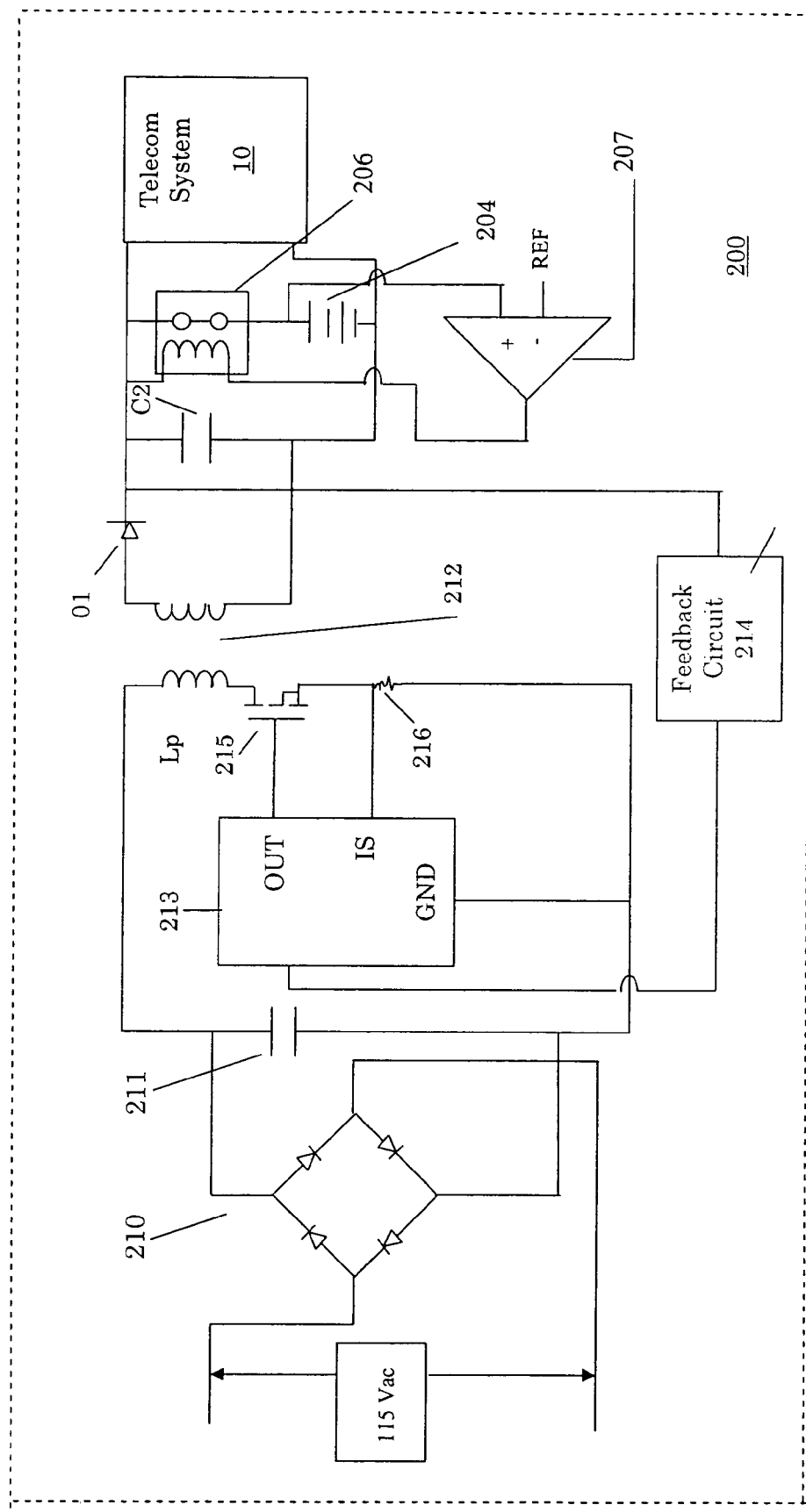
FIG. 15 is a simplified schematic diagram of one embodiment of the AC power supply and battery back-up system of FIG. 14.

FIG. 15 provides more detail about the AC power supply and battery back-up system 200 of FIG. 14. The AC input is connected to a full bridge rectifier 210 which provides a DC voltage across smoothing capacitor 211. The voltage across the smoothing capacitor 211 is supplied to a flyback converter circuit comprising a flyback transformer 212, a control circuit 213, a control circuit 213, a feed back circuit 214, an electronic switch 215, and current sense resistor 216. The flyback converter circuit has long been recognized as a beneficial power supply circuit for its simplicity, low cost, and flexibility. When operated in the so-called discontinuous mode (that is, the magnetic flux in the flyback transformer begins each cycle at zero and ends each cycle at zero) and a fixed switching frequency the output power of the flyback converter is limited to:

$$P_{out} = \frac{1}{2} * L_p * I_{pk}^2 * f_s$$

In this analysis, Lp is the primary inductance of the flyback transformer 212, Ipk is the peak current of the flyback primary, and fs is the switching frequency.

The discontinuous flyback can be applied to the AC power supply/battery back-up system 200 using a low cost, industry standard pulse-width modulation (PWM) integrated control circuit (IC) 213, such as the UC3844. The discontinuous flyback AC/DC circuit is scaled to provide peak power to the telecommunications system 10, which on average draws less than half peak power. During normal operation (AC power on, battery fully charged and floating with maintenance charging current only), the duty cycle of the PWM signal at the output of control circuit 213 varies in response to the feedback circuit 214 so that the power MOSFET switch 215 causes the output voltage measured at the junction of diode D1 and capacitor C2 to remain at a nominal 54 VDC. If AC input voltage is lost, the battery 204 is already connected to the telecommunication system 10 for immediate backup. When AC input voltage is restored, the output voltage measured at the junction of diode D1 and capacitor C2 is pulled down to the battery voltage (which is now lower due to supplying power to the telecommunication system). This output voltage is supplied to the feedback input of control circuit 213 through feedback circuit 214. In this mode, the output power is limited by a peak current limit circuit integral to the control circuit 213 IC, as sensed at current sense resistor 216. The telecommunication system 10 and the battery 203 then split the available power, with the telecommunication system 10 getting what it needs for proper operation and the battery 204 getting the remainder for charging. The batter voltage (and thus the power supply output voltage) climbs as it is being charged. It eventually increases to 54V and then system comes out of power limit and again begins to regulate the output voltage using conventional PWM. No additional or special circuits are required to implement the battery charging and backup function. The elimination of additional charging circuitry and overhead power capacity reduces cost, and overall size, and increases system efficiency.

As discussed above, the invention of this system resides primarily in the novel modular arrangement of conventional analog and digital communication interface circuits and associated analog and digital signal processing components and attendant supervisory control circuitry that controls the operations of such circuits and components. Consequently, the internal configuration of such circuits and components and the manner in which they are interfaced with the corresponding customer premises communication deices have, for the most part, been illustrated in the drawings by readily understandable block diagrams and schematics, which show only those details that are pertinent to the invention, so as not to obscure the disclosure with details which will be readily apparent to those skilled in the art. This, the block diagram illustrations are primarily intended to show the major components of the system in a modular functional grouping, whereby the present invention may be more readily understood.

In addition, the mechanical features corresponding to the modular architecture of this system are illustrated generally in FIGS. 5-8. Although not essential to an understanding of the invention, additional mechanical details about an embodiment of the system are available in applicant's co-pending U.S. patent application Ser. No. 09/549,914; filed Apr. 14, 2000, now U.S. Pat. No. 6,597,576, entitled "Mounting Arrangements for Data Communication Devices", the disclosure of which is incorporated herein by reference. However, the means by which the system modules mechanically engage and electrically interconnect with the system chassis and backplane are not limited to those disclosed here. Those skilled in the art will recognize that a variety of conventional mechanical and electrical connectors and connector systems can be used to implement the modular architecture of the system without departing from the scope of the invention.

The power supply and back-up system has been described with reference to powering an integrated T1 access system. However, those of skill in the art will recognize that the novel features of the power supply and back-up system can be readily adapted for use with a wide variety of telecommunications equipment and other electronic devices that perform critical functions.

Although there have been described particular embodiments of the present invention of a Modular System for Connecting Multiple Customer Premises Voice and Data Communications Devices to a T1 Data Line, it is not intended that such embodiment be construed as limitations upon the scope of the invention except as set for in the following claims.

The invention claimed is:

1. A modular system for connecting multiple voice and data communications devices located at a customer's premises to a T1 network, comprising:
   a system chassis having a system backplane for receiving and connecting one or more system modules to the T1 network:
   one or more system modules removably connected to the system chassis for connecting one or more voice and data communications devices to the T1 network;
   wherein the one or more system modules include dumb access modules, smart access modules, or a combination of both dumb and smart access modules;
   wherein the one or more system modules include any combination of one or more of the following access modules:
   an FXS/FXO access module, wherein the FXS/FXO access module includes an automatic gain control circuit;
   a fractional T1 port;
   a Nx56/64 access module;
   a U-BRITE access module;
   or a DDS access module;
   a bank controller unit that maintains performance information regarding the T1 network and supports the following T1 formats:
   Extended Superframe,
   Superframe,
   TR-08 with alarm-16, and
   TR-08 with alarm-13;
   the bank controller unit providing network and fractional T1 control, access module control, alarm control, user interface control, and backplane control and including a field programmable logic array for providing clock generation, chip select, and backplane interface functions; and
   wherein the field programmable logic array is further used to interface the bank controller unit with each access module using a serial peripheral interface located on system backplane, provide timing generation in local, loop, and external timing modes, provide dialtone and ringback tone generation, multiplex backplane data with fractional T1 data, generate bit clock and byte clock data, and generate chip selects for the T1 interface transceiver, fractional T1 interface transceiver, and front panel LEDs and switches located on the system chassis.

2. The system of claim 1, wherein the access modules include
   a bus transceiver connected to a module signaling bus for interfacing input/output ports on the access modules with a backplane bus on the system backplane; and
   a bus control logic unit coupled to a control bus portion of the backplane for interfacing control signals generated by a processor on the bank controller unit with processor-controlled circuit components on each access module.

3. The system of claim 2, wherein:
   each access module is operable to communicate a module type unique identification code to the bank controller unit, and
   the bank controller unit is responsive to the module type identification code and automatically configures the system to provide access to the network T1 and allocate bandwidth to the customer premises device connected to each access module.

4. The system of claim 3, wherein the bank controller unit controls signaling modes, transmit attenuation, receive attenuation, and 2-wire line impedance for each access module.

5. The system of claim 4, wherein the bank controller unit communicates with smart access modules to determine access module type, timeslot, configuration, status, and test information for the smart access modules.

6. A modular system for providing a functional connection between multiple customer premises communication devices and a T1 network data service terminating at the customer premises, the modular system comprising:
   a. a system chassis having a bank of module slots, each slot adapted for receiving one of a plurality of removable system modules such that the removable system modules can be inserted in and removed from the module slots from a front portion of the chassis;
   b. the system chassis further comprising a system backplane adapted for electrically connecting to system module connectors on a rear portion of the removable system modules;
   c. the removable system modules including a plurality of access modules operable to provide a functional interface between the T1 service and different types of the customer premises communications devices, including both voice and data devices, the access modules used in the removable system modules being selected by the customer to correspond to the types of customer premises communications devices to be connected to the network;
d. a power service unit connected to the modular system for supplying power received from the network T1 to the one or more removable system modules;
e. a bank controller unit connected to the system chassis for controlling the power service unit and the one or more removable system modules, wherein the one or more removable system modules include dumb access modules, smart access modules, or a combination of both dumb and smart access modules;

wherein the bank controller unit provides network and fractional T1 control, access module control, alarm control, user interface control, and backplane control and includes a field programmable logic array for providing clock generation, chip select, and backplane interface functions; and wherein the field programmable logic array is further operable to interface the bank controller unit with each access module using a serial peripheral interface located on the system backplane, provide timing generation in local, loop, and external timing modes, provide dialtone and ringback tone generation, multiplex backplane data with fractional T1 data, generate bit clock and byte clock data, and generate chip selects for the T1 interface transceiver, fractional T1 interface transceiver, and front panel LEDs and switches located on the system chassis.

7. The system of claim 6, wherein the access modules include
    a bus transceiver connected to a module signaling bus for interfacing input/output ports on the access modules with a backplane bus on the system backplane; and
    a bus control logic unit coupled to a control bus portion of the backplane for interfacing control signals generated by a processor on the bank controller unit with processor-controlled circuit components on each access module.

8. The system of claim 7, wherein:
    each access module is operable to communicate a module identification code to the bank controller unit, and
    the bank controller unit is responsive to the module identification code to automatically configure the system to provide access to the network T1 and allocate bandwidth to the customer premises device connected to each access module.

9. The system of claim 8, wherein the bank controller unit controls signaling modes, transmit attenuation, receive attenuation, and 2-wire line impedance for each access module.

10. The system of claim 9, wherein the bank controller unit communicates with smart access modules to determine access module type, timeslot, configuration, status, and test information for the smart access modules.

* * * * *